United States Patent
Marcel et al.

[11] Patent Number: 5,490,538
[45] Date of Patent: Feb. 13, 1996

[54] AUTOMATIC RAIN WATER COLLECTION DEVICE ON DOWNPIPE

[76] Inventors: Robert Marcel, 3, rue de la Papeterie; Michel Babaz, 11, rue du Levant, both of 74960 Cran-Gevrier, France

[21] Appl. No.: 256,162
[22] PCT Filed: Jan. 29, 1993
[86] PCT No.: PCT/FR93/00102
  § 371 Date: Jun. 24, 1994
  § 102(e) Date: Jun. 24, 1994
[87] PCT Pub. No.: WO93/15281
  PCT Pub. Date: Aug. 5, 1993

[30] Foreign Application Priority Data
  Jan. 31, 1992 [FR] France .................. 92 01319

[51] Int. Cl.$^6$ ............... E03B 3/02; B04D 13/08
[52] U.S. Cl. ............ 137/357; 137/561 A; 52/16
[58] Field of Search ................... 137/317, 318, 137/357, 561 A, 873; 52/16

[56] References Cited

U.S. PATENT DOCUMENTS

| | | | |
|---|---|---|---|
| 3,460,715 | 8/1969 | Lane et al. .............. | 137/318 X |
| 3,674,235 | 7/1972 | Porter et al. ............ | 251/162 |
| 3,990,474 | 11/1976 | Harms .................... | 52/16 X |
| 4,182,376 | 1/1980 | Nilsson .................. | 137/357 X |
| 4,258,941 | 3/1981 | Sands ............... | 137/318 X054907068 |
| 5,114,954 | 5/1992 | Rosebrock et al. ......... | 137/357 X |

FOREIGN PATENT DOCUMENTS

| | | | |
|---|---|---|---|
| 181128 | 9/1992 | Australia ................ | 52/16 |
| 0432657 | 6/1991 | European Pat. Off. ....... | 52/16 |
| 2908620 | 9/1980 | Germany .................. | 52/16 |
| 3105744 | 9/1982 | Germany . | |
| 3518302 | 11/1986 | Germany . | |
| 8810398 | 10/1988 | Germany . | |
| 601608 | 7/1978 | Switzerland .............. | 52/16 |
| 2248262 | 4/1992 | United Kingdom .......... | 52/16 |

*Primary Examiner*—John Rivell
*Attorney, Agent, or Firm*—William H. Eilberg

[57] ABSTRACT

The device comprises a branch collar suitable for fitting onto a down pipe and having an orifice coinciding with an orifice in the side of the down pipe, the orifices allowing for the insertion of an elastic scoop which, once in the pipe, will adapt to all or part of the inside of wall of the pipe. The scoop is extended by a valve body secured to the branch collar grooves and projections.

10 Claims, 3 Drawing Sheets

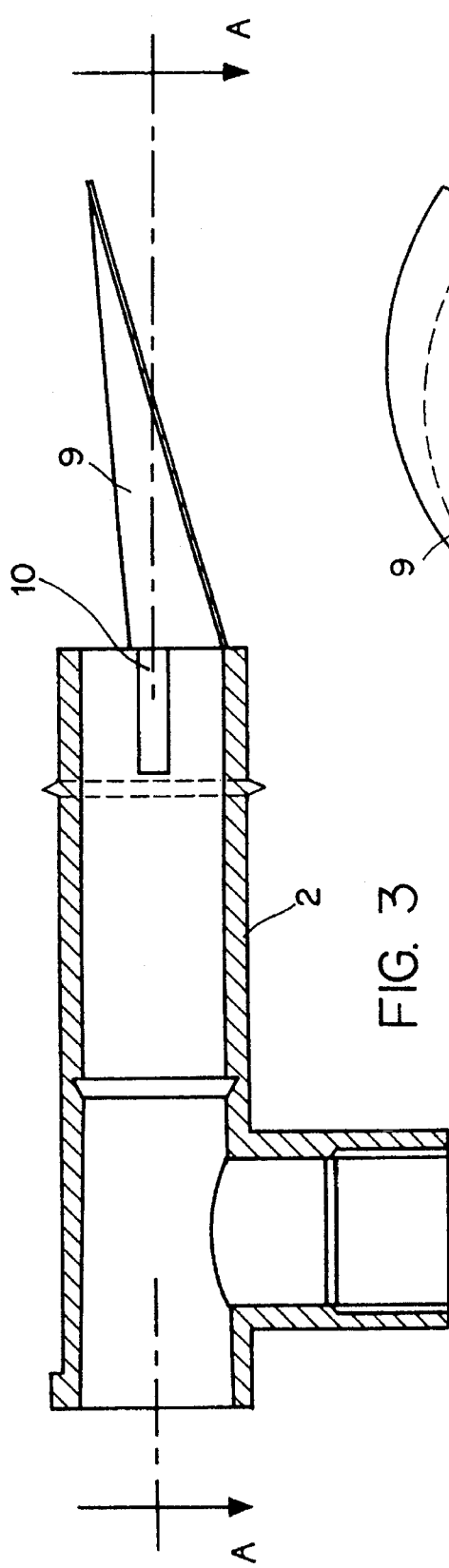
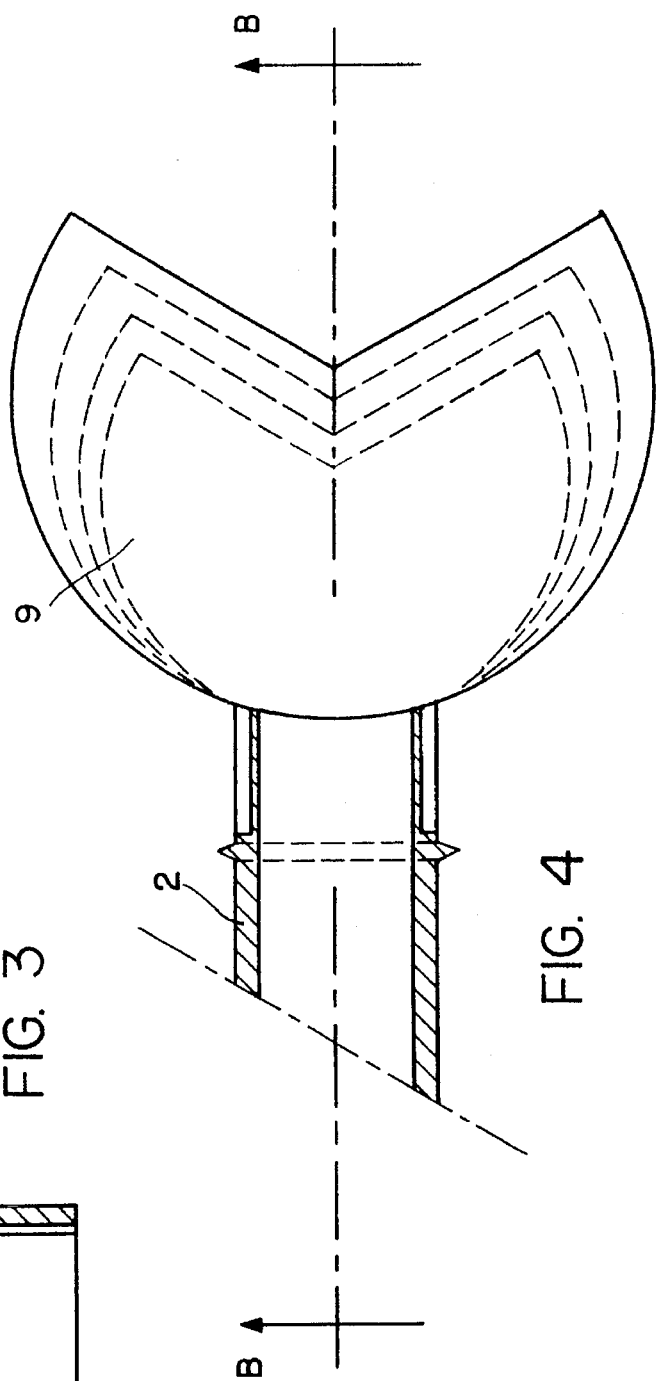

AUTOMATIC RAIN WATER COLLECTION DEVICE ON DOWNPIPE

The present invention concerns a device for collecting rain water from inside a drain pipe, so that wasting drinking water and money can be avoided.

Rain water is conventionally collected by installing a container under the pipe cut off at a certain height with no possibility of removing excess water other than by it overflowing from the container or by installing a diversion using a sleeve.

The device of the invention is inserted into an orifice formed in the side of the pipe, without cutting and without sleeving, and is fastened to said pipe by means of a collar or saddle. An orifice in the saddle coincides with the orifice in the pipe.

The water is collected by a trough or scoop. All or part of the outside edge of the scoop inside the pipe is in contact with the inside wall of said pipe.

Alternatively, occupying only part of the pipe, the scoop is not in contact with the wall.

The part of the scoop which extracts the water discharges outside the pipe and is in the form of a tap body or is extended by a tap body.

The part of the tap body outside the pipe passes through the saddle. The tap body is fastened to the saddle by means of a groove on one and a tenon or key on the other, or by virtue of coincidence of one plane with another. The tenons or keys are called bosses. A shoulder fastened to the saddle is inserted into the orifice to locate the saddle on the drain pipe.

The appended drawings show one embodiment of the invention by way of non-limiting example.

FIG. 3 is an elevation view of the tap extending the scoop in cross-section on the line B—B.

FIG. 4 is a plan view of the scoop.

Figure 1:
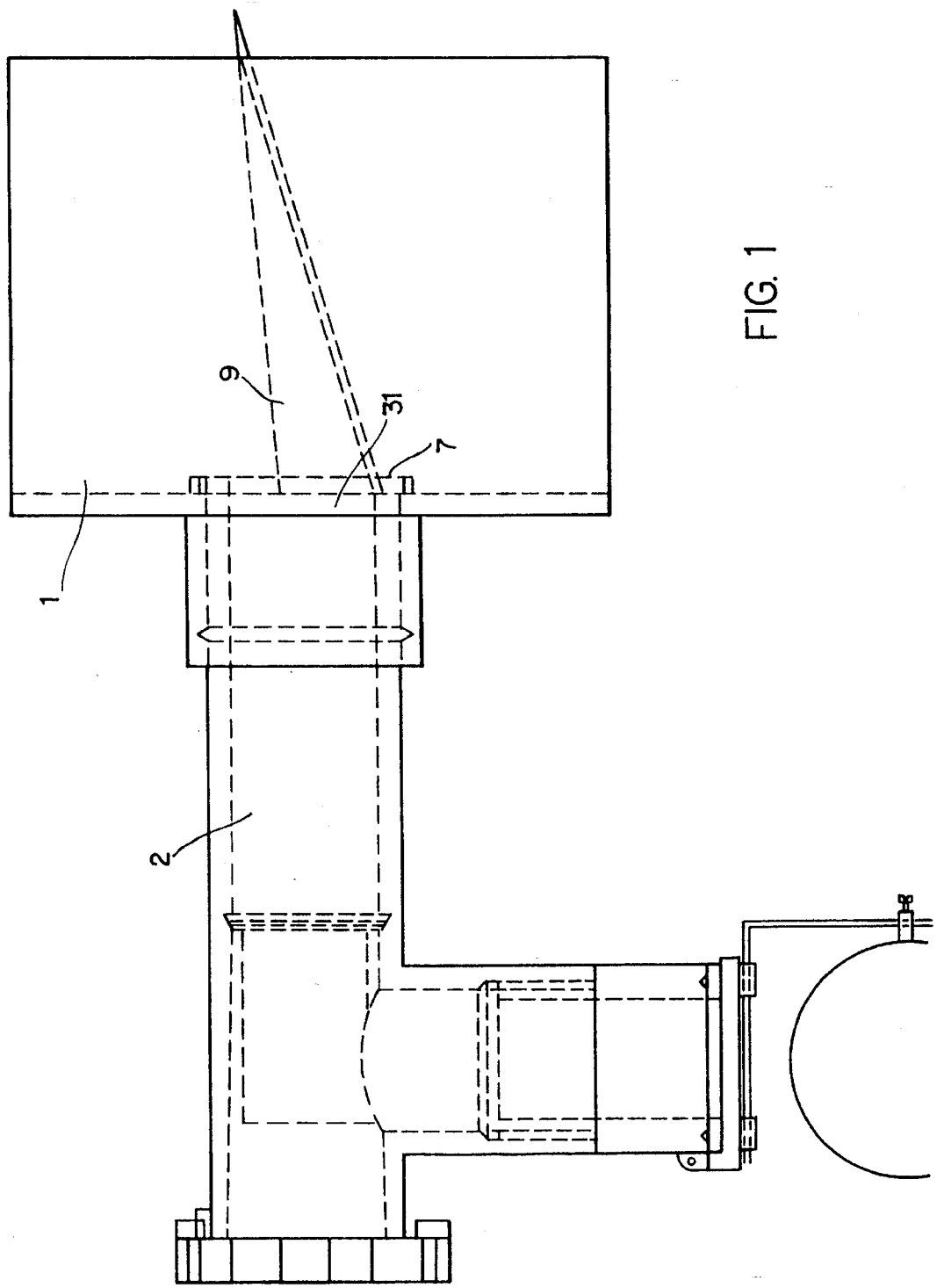
FIG. 1 is an elevation view of the device.
Figure 2B:
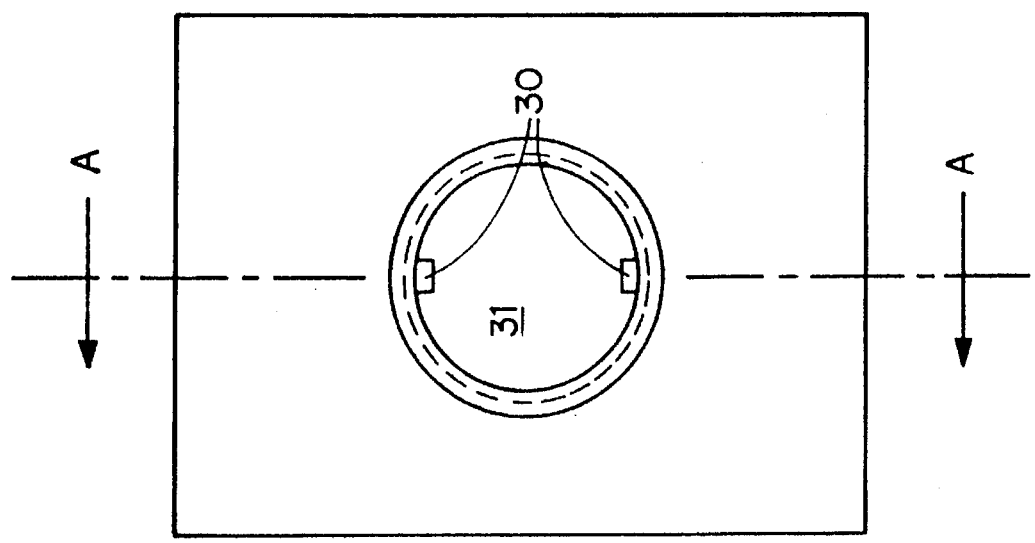
FIG. 2 shows the saddle and its connection to the tap extending the scoop in elevation and in cross-section on the line A—A.
Figure 2A:
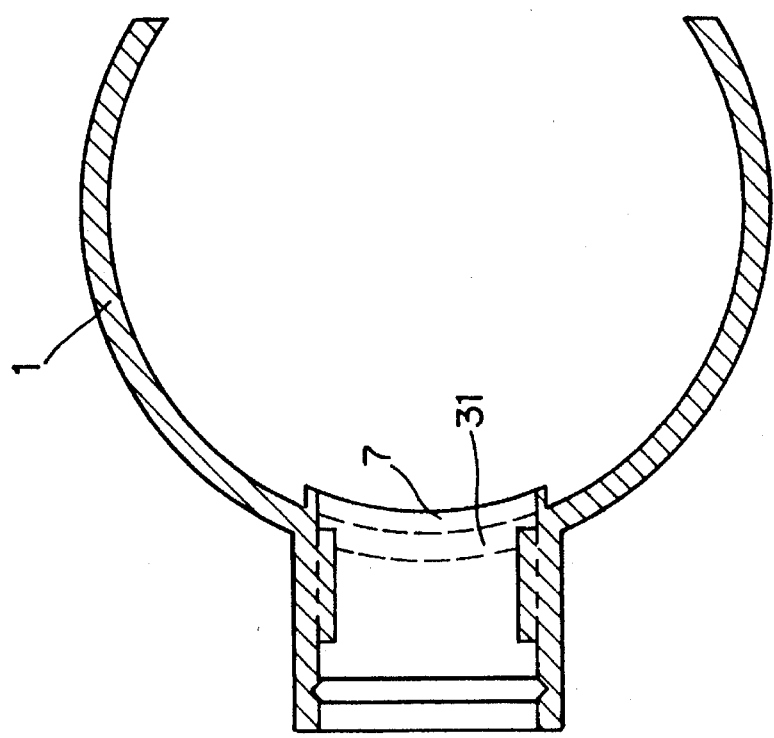

Referring to FIGS. 1 and 2, a tap body 2 extended by a scoop 9 shown in detail in FIG. 4 passes through the saddle 1.

A shoulder 7 that can be seen in FIG. 2, inserted in the orifice in the drain pipe (not shown) locates the saddle 1. Bosses 30 (FIG. 2) act as lateral guides for the grooves 10 (FIG. 3) of the tap body 2, preventing the latter from rotating, especially when it is nested in the saddle 1.

The part of the scoop 9 adapted to be located inside the drain pipe is inclined to extract water, the lowest point being towards its part outside the pipe. Its lowest point is therefore the point nearest the orifice 31 in the saddle 1 fastened to the tap body 2. After it is compressed to insert it into the orifice formed in the drain pipe, this part of the scoop 9, which is elastic, for example, resumes its original shape, allowing it to mate with the inside wall of said pipe and so collect almost all of the water flowing therein.

This part of the scoop 9 occupies only part of the cross-section area of the drain pipe, enabling surplus water to flow.

The tap body 2 can be associated with an automatic valve or any other system connecting to a collection container.

We claim:

1. Device for collecting rain water from inside a drain pipe characterised in that it comprises:

a deformable scoop (9) adapted to be compressed for insertion into an orifice formed in the side of said pipe and adapted thereafter to resume its shape to collect water flowing in said drain pipe and to remove it from said pipe, a saddle (1) adapted to be fitted to the drain pipe and having an orifice (31) coincident with the orifice formed in the drain pipe, the saddle (1) fastening the device to the drain pipe, a body (2) extending said deformable scoop (9) and passing through the saddle (1) to remove water from said drain pipe.

2. Device according to claim 1 characterised in that the saddle (1) is in the form of a collar and comprises means (7) for locating it on the drain pipe.

3. Device according to claim 2 characterised in that the saddle (1) locating means comprise a shoulder (7) entering the orifice in the drain pipe.

4. Device according to claim 1 characterised in that it further comprises fastening means (10, 30) for fastening the body (2) to the saddle (1).

5. Device according to claim 4 characterised in that the fastening means comprise coincident planes.

6. Device according to claim 4 characterised in that the fastening means comprise grooves (10) and bosses (30) preventing the body (2) from rotating when it is nested in the saddle (1).

7. Device according to claim 1 characterised in that the past of the scoop (9) inside the drain pipe is inclined to remove water, its lowest point being the point nearest the orifice (31) in the saddle (1) fastened to the body (2).

8. Device according to claim 1 characterised in that the scoop (9) is elastic.

9. Device according to claim 1 characterised in that the part of the scoop (9) inside the drain pipe comprises an outside edge which is wholly or partially in contact with an inside wall of said drain pipe to collect water flowing therein.

10. Device according to claim 1 characterised in that the part of the scoop (9) inside the drain pipe occupies only part of the cross-section area of the drain pipe to enable surplus water to flow.

* * * * *